US010326857B2

(12) United States Patent
Rabbani et al.

(10) Patent No.: US 10,326,857 B2
(45) Date of Patent: Jun. 18, 2019

(54) USER DATA MANAGEMENT

(71) Applicant: TELEFONAKTIEBOLAGET L M ERICSSON (PUBL), Stockholm (SE)

(72) Inventors: Farooq Rabbani, Handsworth Birmingham (GB); Claudia Eisbrenner, Stockholm (SE); Mikael Forsberg, Tyresö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 456 days.

(21) Appl. No.: 14/906,976

(22) PCT Filed: Jul. 30, 2013

(86) PCT No.: PCT/EP2013/065972
§ 371 (c)(1),
(2) Date: Jan. 22, 2016

(87) PCT Pub. No.: WO2015/014388
PCT Pub. Date: Feb. 5, 2015

(65) Prior Publication Data
US 2016/0182675 A1 Jun. 23, 2016

(51) Int. Cl.
*G06F 15/173* (2006.01)
*H04L 29/08* (2006.01)
(Continued)

(52) U.S. Cl.
CPC .......... *H04L 67/306* (2013.01); *G06F 16/986* (2019.01); *H04L 61/6054* (2013.01);
(Continued)

(58) Field of Classification Search
None
See application file for complete search history.

(56) References Cited

U.S. PATENT DOCUMENTS 9,560,515 B2 * 1/2017 Brianza ............... H04W 8/04
2006/0178132 A1 * 8/2006 Tammi .................. H04L 63/10
455/411
(Continued)

FOREIGN PATENT DOCUMENTS

WO 2009049664 A1 4/2009

OTHER PUBLICATIONS

3GPP TS 24.623 V12.0.0, 3rd Generation Partnership Project; Technical Specification Group Core Network and Terminals; Extensible Markup Language (XML) Configuration Access Protocol (XCAP) over the Ut interface for Manipulating Supplementary Services (Release 12), Dec. 2012.
(Continued)

*Primary Examiner* — Mohamed Ibrahim
(74) *Attorney, Agent, or Firm* — Sage Patent Group

(57) ABSTRACT

An XML Document Management Server for use within an IP Multimedia Subsystem, IMS, network and being configured to enable IMS subscribers and a network operator to manage supplementary service data stored in a subscription data repository. The Server comprises a first interface or interfaces for receiving supplementary service data requests, and a request parser configured, for each request, to parse the request to determine if it contains both an X-3GPP-Asserted-Private-Identity header and an X-3GPP-Asserted-Identity header. The server further comprises an Sh interface for generating an Sh message corresponding to each request and, in the event that both an X-3GPP-Asserted-Private-Identity header and an X-3GPP-Asserted-Identity header are present in the request, for including these in the Sh message, and for sending the Sh message to said subscription data repository.

13 Claims, 11 Drawing Sheets

(51) Int. Cl.
*H04L 29/06* (2006.01)
*H04L 29/12* (2006.01)
*G06F 16/958* (2019.01)

(52) U.S. Cl.
CPC ...... *H04L 65/1016* (2013.01); *H04L 65/1063* (2013.01); *H04L 65/1076* (2013.01); *H04L 61/1588* (2013.01); *H04L 67/02* (2013.01)

(56) References Cited

U.S. PATENT DOCUMENTS

| | | | | |
|---|---|---|---|---|
| 2007/0156704 | A1* | 7/2007 | De Boer | H04W 8/18 |
| 2008/0013533 | A1* | 1/2008 | Bogineni | H04L 41/12 370/389 |
| 2013/0151720 | A1* | 6/2013 | Klein | H04L 65/1063 709/227 |

OTHER PUBLICATIONS

Rosenberg, IETF RFC 4825, "The Extensible Markup Language (XML) Configuration Access Protocol (XCAP)," May 2007.
Franks, et al., IETF RFC 2617, "HTTP Authentication: Basic and Digest Access Authentication," Jun. 1999.
Fielding, et al., IETF RFC 2616, "Hypertext Transfer Protocol—HTTP/1.1," Jun. 1999.
3GPP TS 23.228 V11.0.0, 3rd Generation Partnership Project; Technical Specification Group Services and System Aspects; IP Multimedia Subsystem (IMS); Stage 2 (Release 11), Mar. 2011.
3GPP TS 33.222 V12.0.0, 3rd Generation Partnership Project; Technical Specification Group Services and System Aspects; Generic Authentication Architecture (GAA); Access to network application functions using Hypertext Transfer Protocol over Transport Layer Security (HTTPS) (Release 12), Dec. 2012.
3GPP TS 24.109 V11.2.0, 3rd Generation Partnership Project; Technical Specification Group Core Network and Terminals; Bootstrapping interface (Ub) and network application function interface (Ua), Protocol details (Release 11), Dec. 2012.
Dierks, et al., IETF RFC 2246, The TLS Protocol, Jan. 1999.
ETSI TS 183 038 V1.1.1, Telecommunications and Internet converged Services and Protocols for Advanced Networking (TISPAN); PSTN/ISDN Simulation Services; Extensible Markup Language (XML) Document Management; Protocol Specification, Apr. 2006.
3GPP TS 22.173 V12.3.0, 3rd Generation Partnership Project; Technical Specification Group Services and System Aspects; IP Multimedia Core Network Subsystem (IMS) Multimedia Telephony Service and supplementary services; Stage 1 (Release 12), Dec. 2012.
3GPP TS 29.328 V11.5.0, 3rd Generation Partnership Project; Technical Specification Group Core Network and Terminals; IP Multimedia (IM) Subsystem Sh Interface; Signalling flows and message contents (Release 11), Dec. 2012.
3GPP TS 29.329 V11.4.0, 3rd Generation Partnership Project; Technical Specification Group Core Network and Terminals; Sh Interface based on Diameter Protocol; Protocol details (Release 11), Dec. 2012.
3GPP TSG-CT1 Meeting #43, Tdoc C1-061441, Procedures for PNM User Interactions, BenQ Mobile, Da Lian, China, Aug. 28-Sep. 1, 2006.
3GPP TS 29.328 V12.1.0, 3rd Generation Partnership Project; Technical Specification Group Core Network and Terminals; IP Multimedia (IM) Subsystem Sh Interface; Signalling flows and message contents (Release 12), Jun. 2013.
3GPP TSG-SA WG2 #40, Tdoc S2-042270, Clarification of IMS identity sharing, Nortel Networks, Sophia Antipolis, France, May 17-21, 2004.

* cited by examiner

USER DATA MANAGEMENT

This application is a 371 of International Application No. PCT/EP2013/065972, filed Jul. 30, 2013, the disclosure of which is fully incorporated herein by reference.

TECHNICAL FIELD

The present invention relates to user data management within a communications network.

More particularly it relates to the management of user data related to so-called Supplementary Services such as those available in a IP Multimedia Subsystem network.

BACKGROUND

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This is leading to a new generation of personalised, rich multimedia communication services, including so-called "combinational IP Multimedia" services.

IP Multimedia Subsystem (IMS) is the technology defined by the Third Generation Partnership Project (3GPP) and ETSI TISPAN group to provide IP Multimedia services over mobile communication networks. IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and application servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. ASs provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which ASs should be "linked in" during a SIP Session establishment (or indeed for the purpose of any SIP method, session or non-session related). The IFCs are received by the S-CSCF from an HSS during the IMS registration procedure as part of a user's or subscriber's Subscriber Profile.

IMS users make use of User Equipment (UE) which may comprise or represent any device used for communications. Examples of UEs that may be used in certain embodiments of the described network(s) are wireless devices such as mobile phones, terminals, smart phones, portable computing devices such as lap tops, handheld devices, tablets, netbooks, computers, personal digital assistants and other wireless communication devices, or wired communication devices such as telephones, computing devices such as desktop computers, set-top boxes, and other fixed communication devices.

IMS subscribers are identified in the IMS by both a private user identity [IP Multimedia Private Identity (IMPI)] and a public user identity [IP Multimedia Public Identity (IMPU)]. The IMPI represents the subscriber's subscription, whilst the IMPU is a public identity that can be used, for example, by other users and service providers to contact the subscriber to whom the IMPU belongs. A subscription may have a plurality of IMPUs associated with it, e.g. a given subscription may have an IMPU representing an office contact for the subscriber and an IMPU representing a home contact for the subscriber. The subscriber may define different behaviours for the two IMPUs.

A Ut interface (or more correctly "reference point") has been specified between the AS and a UE (e.g. 3GPP Technical Specification 23.002). The Ut interface enables a user to manage information relating to his or her services, e.g. creation and assignment of Public Service Identities, management of authorisation policies that are used for example by presence services, conference policy management, etc. The Ut interface allows in particular a user to manipulate Extensible Markup Language (XML) data associated with an AS and which defines how certain services are provided to that user. An example use case is that of MMTel supplementary services, and the manipulation of these services via the Ut interface. MMTel is a multimedia telephony service for subscribers, facilitated by the MMTel AS, and manipulation of XML data via the Ut interface allows subscribers to set and change settings such as call forwarding, call barring, etc. This is discussed in 3GPP TS 24.623 V12, Extensible Markup Language (XML) Configuration Access Protocol (XCAP) over the Ut interface for Manipulating Supplementary Services.

XML documents are handled by XML Document Management Servers (XDMSs), which may be co-located with ASs, e.g. with an MMTel AS. In use, an XDMS stores service data into a Home Subscriber Server (HSS) (as transparent data), which is then retrieved by the AS at service invocation.

ETSI TISPAN has adopted the XML Configuration Access Protocol (XCAP), as specified in IETF RFC 4825 and 2616, for use over the Ut interface and which facilitates the use of HTTP methods, i.e. GET, PUT, and DELETE, to operate on XML data stored in the HSS, via an XDMS. The XCAP protocol defines how XCAP Uniform Resource Identifiers (URIs) are used to identify precise locations within XML documents on the XCAP server. FIG. 2 illustrates schematically the Ut interface in the IMS.

The XML documents defining customer services and settings are handled by the XDMS. A so-called "Sh" interface allows the XDMS to communicate with the HSS using DIAMETER. [This is considered in detail in 3GPP TS 29.328 V11.5.0 Sh Interface Signalling Flows, and in 3GPP TS 29.329 V11.4.0 Interface Based on Diameter Protocol.] A network operator may initially install pre-configured XML data, based upon the standardised XML schema, on a per-user basis into the HSS, and subsequently amend the installed XML data via the XDMS. The management network additionally provides a mechanism whereby a user can edit his/her associated XML document. For this purpose, a Ut client can be installed within the UE and/or within a web portal. As discussed above, the Ut client uses the XCAP protocol to retrieve (either the whole document or a fragment thereof) and amend the XML document (or fragment) associated with the user. It will be appreciated that the XDMS reacts to a retrieval request from a user via the UE or web portal by obtaining the relevant XML data from the HSS and delivering this to the user via the UE or web portal over the Ut interface.

The Ut client fetches the data for the user from the XDMS by sending an XCAP HTTP GET request to the XDMS over the Ut interface. An Aggregation Proxy may be used to authenticate these requests. The XDMS fetches the data from the HSS over the Sh interface and sends it back to the Ut client in a Ut response message. The Ut client displays information and options to the user.

When sending an HTTP request to the XDMS to manipulate the MMTel supplementary services, the UE uses an XCAP Identity that is an IMPU of the user, as defined in [3GPP TS 24.109 Bootstrapping interface (Ub) and network application function interface (Ua), Rel 11]]. The UE may be authenticated to the IMS using, for example, the Generic Authentication Architecture (GAA) involving the Authentification Proxy (AP). When 3GPP GAA is not present, the X-3GPP-Asserted-Identity is used. When 3GPP GAA is present the X-3GPP-Intended-Identity can be used, with the AP replacing the X-3GPP-Intended-Identity with the X-3GPP-Asserted-Identity. The X-3GPP-Intended-Identity is optional and the UE may send it indicating which "alias" of the IMPU the AP should consider for authentification and requests (3GPP TS 33.222 Rel 11 and 24.109 Rel 12).

Although each IMS subscription must be associated with at least one IMPI, a single subscription may be associated with two or more IMPIs. FIG. 3 gives an example of an HSS data model for a given subscription. The example relates to a subscription associated with two IMPIs and six IMPUs. The IMPUs are grouped into three Implicit Registration Sets (IRSs), with the IMPUs of each set being registered collectively. Four different service profiles are specified for the subscription, these service profiles being shared across different IRSs. The service profiles are of course defined in the XML documents stored in the HSS and accessed by the subscribers UE(s) via the XDMS and the Ut and Sh interfaces. The HSS data model for IMPI, IMPU and service profile relationship is considered in 3GPP TS 23.228 IP Multimedia Subsystem (IMS) Rel 11.

It is noted here that IMS subscribers may be fixed line subscribers, rather than mobile (e.g. LTE) subscribers. In this case, a subscriber's private user identity will be an IMSI whilst his or her public user identity will be an MSISDN. Whilst the following discussion relates to the IMPI/IMPU case, it will be appreciated that it relates equally to the IMSI/MSISDN case.

Considering further the Ut interface, a subscriber's UE can access an entire simservs.xml document by including in the (e.g. HTTP GET) request a URI with no node selector, for example as shown in Table 1 below. An example of a successful, 200 OK response to this document granularity GET is shown in Table 2 below.

Alternatively, an individual element (or fragment) from within the simservs.xml document can be obtained by the Ut client by using a node selector (following the node selector separator "~~"). For example, to obtain the element communication-diversion and its contents a node selector of simservs/communication-diversion can be used as shown in Table 3 below. An example of a successful 200 OK response to this element granularity GET is shown in Table 4 below.

It will be appreciated from the above discussion that the current approach to manipulating service data makes use of the IMPU (i.e. X-3GPP-Asserted-Identity sent in XCAP) to define the part or parts of a service data block that should be provided to a UE (or operator node). This is adequate for the simple case where, for example, a subscription is associated with a single IMPI and one or more IMPUs. However, the approach is not necessarily appropriate for more complex subscription scenarios such as:

MultiSim (where a single subscription is associated with multiple IMPIs); and/or Multi-number (where a single subscription is associated with multiple IMPUs), where a service data repository may be shared or unique for an IMPI/IMPU combination, such that providing an IMPU to access the data is insufficient to identity the correct shared or unique service data repository.

FIG. 4 shows a MultiSim scenario for a given subscription, where both IMPIs are associated with the same IMPU. However, separate repository service data is specified, one for IMPI1 and one for IMPIn. In this scenario, it is not possible for IMPI1 (e.g. UE1) to access its repository service data "A" via the Ut interface by providing only the X-3GPP-Asserted-Identity, i.e. an IMPU, as an IMPU points to both repository service data "A" and repository data "B". The same applies in the case of IMPIn. This problem is illustrated further in FIG. 5 which illustrates the following signalling:

1. IMPI1 sends a Ut PUT command to update its repository data.
2. AP forwards the command to the XDMS.
3. XDMS sends a UDR with:
   Service-Indication AVP="service indication string"
   Public-Identity AVP=X-3GPP-Asserted-Identity=IMPU
   Data-Reference AVP=0
4. The HSS is unable to comply with the Sh request as XDMS has only provided the IMPU, and the IMPU points to two repositories A and B: Repository A for IMPI1 and Repository B for IMPIn.
5. HSS sends a UDA (5012 DIAMETER_UNABLE_TO_COMPLY) to XDMS
6. The XDMS sends back a negative 5xx HTTP response to AP
7. AP forwards the negative 5xx HTTP response to IMPI1.

FIG. 6 illustrates a scenario involving a MultiSim with IMPI1 and IMPI2 but with a single IMPU and a single repository data containing service data for both IMPI1 and IMPIn. Using the XCAP approach described above, it is not possible for IMPI1 (UE1) to access correctly its service data within the single repository as the repository is also storing IMPIn service data. Without logical segregation of IMPI1 and IMPIn service data within the repository it is not possible for a MultiSim subscription with single IMPU to access service data. This is illustrated further in the signalling flow of FIG. 7.

Problems also arise for a Single Sim scenario in which a number of IMPUs (n) share the same repository data. As the Ut interface only provides the X-3GPP-Asserted-Identity=IMPU, it is not possible to access within the repository data the correct service data for the IMPI and IMPU combination. This scenario and problem are illustrated in FIGS. 8 and 9.

SUMMARY

It is an object of the present invention to provide a mechanism for enabling 3GPP LTE/ICS IMS users with MultiSim and/or MultiNumber services to manipulate, read, and update their IMS service subscription service data via the Ut interface. It is a further object to enable other interfaces, including operator interfaces, to be used to read, and update such IMS service subscription service data.

According to a first aspect of the present invention there is provided an XML Document Management Server for use within an IP Multimedia Subsystem, IMS, network and being configured to enable IMS subscribers and a network operator to manage supplementary service data stored in a subscription data repository. The Server comprises a first interface or interfaces for receiving supplementary service data requests, and a request parser configured, for each request, to parse the request to determine if it contains both an X-3GPP-Asserted-Private-Identity header and an X-3GPP-Asserted-Identity header. The server further comprises an Sh interface for generating an Sh message corresponding to each request and, in the event that both an X-3GPP-Asserted-Private-Identity header and an X-3GPP-Asserted-Identity header are present in the request, for including these in the Sh message, and for sending the Sh message to said subscription data repository.

Each said request may be one of a request to obtain a data block from the subscription data repository and a request to store or change a data block in the subscription data repository. The Sh interface may be configured to receive a response from said subscription data repository, that response either including a requested data block or including a response to the store or change request, said first interface being configured to send the received response to a requesting entity. The first interface may be a Ut interface towards a Ut client, said request being an XCAP request, although other interfaces may alternatively be used.

According to a second aspect of the present invention there is provided User Equipment configured to enable a user to access IP Multimedia Subsystem, IMS, services and comprising a Ut client. The Ut client comprises an XCAP request generator for generating an XCAP request in respect of a data block of supplementary service data stored in a subscription data repository within an IMS network, the data block being associated with a given private user identity (IMPI) and a given public user identity (IMPU) of the user. The XCAP request generator further comprises a request handler for including said private and public user identities within the XCAP request as an X-3GPP-Asserted-Private-Identity header and an X-3GPP-Asserted-Identity header or an X-3GPP-Intended-Indentity header.

The public user identity may be an MSISDN based IMPU and said private user identity is an IMPI derived from an IMSI.

According to a third aspect of the present invention there is provided a method of managing supplementary service data associated with an IP Multimedia subscription. The method comprises, within a subscription data repository, segregating said service data into a plurality of data blocks according to the private user identities (IMPIs) and public user identities (IMPUs) to which they relate, and receiving requests for data blocks. Each request is parsed to identify an X-3GPP-Asserted-Private-Identity header and an X-3GPP-Asserted-Identity header. The identified X-3GPP-Asserted-Private-Identity header and X-3GPP-Asserted-Identity header are used to identify the associated data block, and the identified data block is sent to a requesting entity.

The method may comprise initiating said requests at one of a Ut client within a User Equipment and a network operator entity, the requests being received at an XDMS, via a Ut reference point, where said step of parsing is carried out. The XDMS and said subscription data repository may be coupled via an Sh reference point.

The step of segregating said service data into a plurality of data blocks according to the private user identities (IMPIs) and public user identities (IMPUs) to which they relate may comprise, for users with MultiSim and MultiNumber subscriptions each with a shared repository data, segregating the shared repository service data into IMPU/IMPI data blocks to allow the identified X-3GPP-Asserted-Private-Identity header and X-3GPP-Asserted-Identity header to be used to identify the associated data block.

Alternatively, said step of segregating said service data into a plurality of data blocks according to the private user identities (IMPIs) and public user identities (IMPUs) to which they relate may comprise, for users with MultiSim and MultiNumber subscriptions with unique repository service data for each IMPU/IMPI, mapping each subscription repository service data to a respective data block.

DETAILED DESCRIPTION

The problems associated with certain complex subscription scenarios, including by way of example subscriptions with MultiSim single number and SingleSim with Multi-Number, where shared and unique repository data relating to Supplementary Services exists, have been discussed above. These problems make it difficult in particular for users and operators to manipulate MMTel supplementary service data, for example to manage MMTel call forwarding and call barring.

A solution that is proposed here is to provide, within the XCAP requests relating to supplementary service data, a new X-3GPP-Asserted-Private-Identity (IMPI) along with the currently required X-3GPP-Asserted-Identity (IMPU), both of which are used on the Sh interface to enable the HSS to identify the correct repository service data. This applies in particular to the following cases:

MultiSim with a single IMPU, with each SIM having unique repository service data; and
SingleSim with multiple IMPUs, with each IMPU having unique repository service data.

Once the data has been retrieved by the XDMS/AS from the HSS using the X-3GPP-Asserted-Identity (IMPU) and X-3GPP-Asserted-Private-Identity (IMPI), a solution is also provided to enable the XDMS/AS to access and read/write the correct service data within a shared repository: the repository service data is segregated into IMPI/IMPU sections to clearly identify the correct service data within repository. This applies in particular to the following cases:

MultiSim with a single IMPU, with sharing of the same repository data; and
SingleSim with multiple IMPUs, with sharing of the same repository data.

It is noted that, for all examples presented below (see FIGS. 15, 17, and 19), in step1, the user sends the X-3GPP-ASSERTED-INDENTITY. However, in an alternative implementation also specified in 3GPP TS 33.222 Rel 11, 24.109 Rel 12 and OMA-TS-XDM_Core-V1_1-20080627-A, the user may optionally send a X-3GPP-INTENDED-INDENTITY header identifying the alias of the IMPU to be used, and in step 2 the AP replaces this X-3GPP-INTENDED-INDENTITY with the X-3GPP-ASSERTED-INDENTITY header.

Considering the Sh interface between the XDMS and the HSS, currently the Private Identity (IMPI) AVP is optional in the Sh messages and conditional if it is used in a Sh message as an access key on the Sh interface for retrieving and receiving data from HSS for data references 14, 15, 17 and 24 to 31 [3GPP TS 29.328 V11.5.0 Sh Interface signalling Flows]. In order to implement the approach presented here, the sending of Private-Identity AVP as conditional access key is extended to be optionally included as part of an access key for data references 0, 10 and 11. This is illustrated in Table 5 below.

Figure 10:
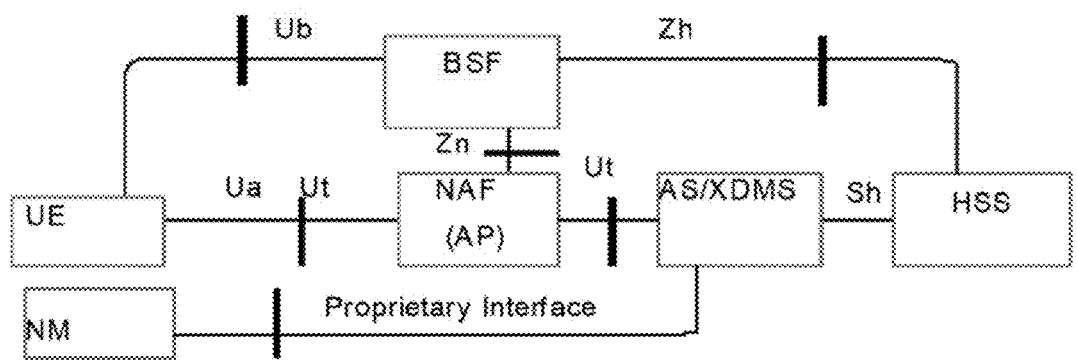
FIG. 10 illustrates schematically a Ut management interface and operator NM interface.

FIG. 10 illustrates schematically the Ut (user) and Operator Network Management (NM) access to IMS with authentication interfaces. The Operator Network Management interface is typically a proprietary interface and is used for operator only management of the operator part of the user's MMTel services. The Network Application Function (NAF) or Authentication Proxy is used for user authentication. The Ua, Ub, and Zh interfaces are used for authentication. Once the authentication is done, the Ut interface can be used by the UE (XCAP client) to manipulate the user's MMTel service data on the HSS via the AS/XDMS. After authentication the NAF (AP) acts as a reverse proxy transparently forwarding XCAP messages to the XDMS or XDMS/AS. NB. The XCAP client may also be an web application, such as a web portal.

Figure 11:
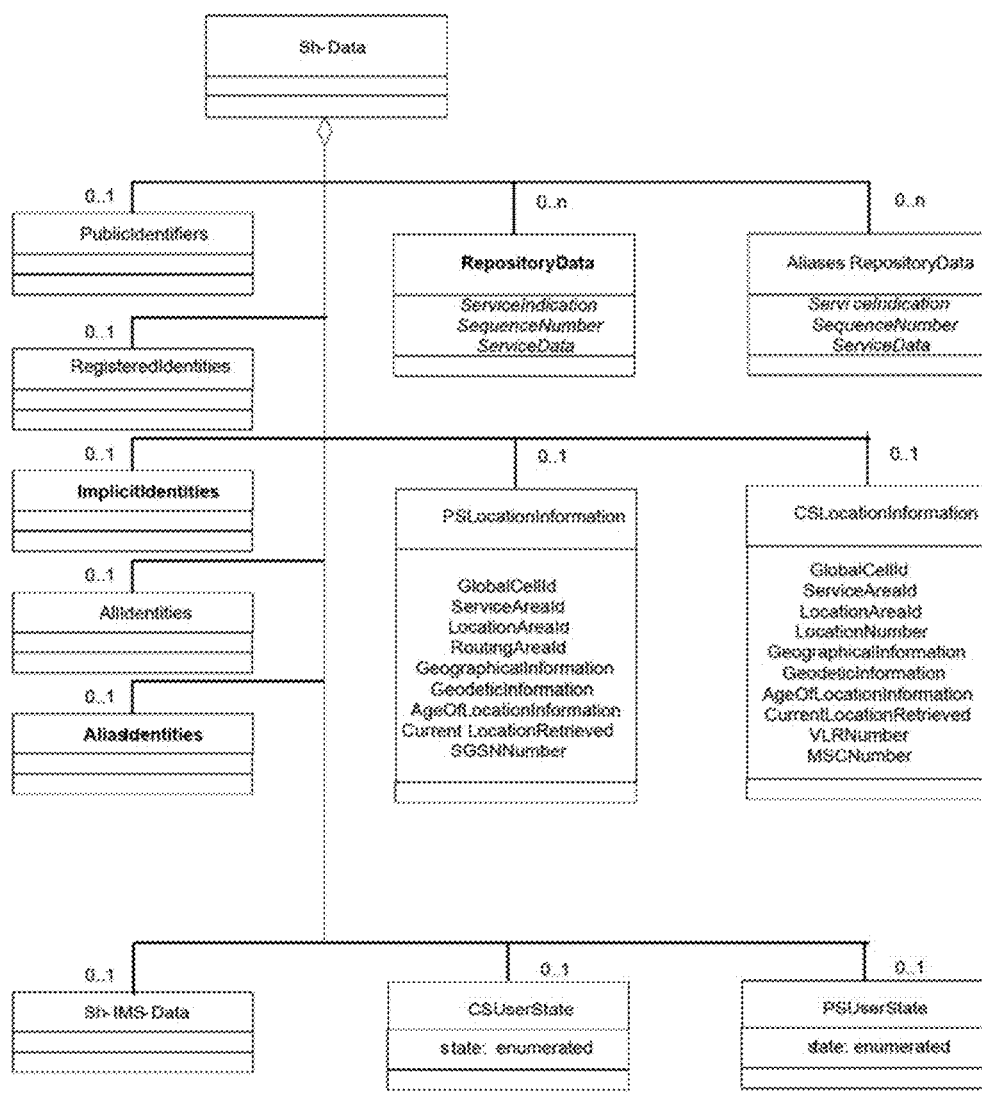
FIG. 11 shows exemplary repository data for an IMS user.

FIG. 11 shows the Sh data model (3GPP TS 29.328) for accessing IMS subscribers' Repository data (service data in the service profile). Repository data is currently indexed and retrieved by providing the following information:

1) ServiceIndication, which is a formally defined String.
2) IMPU representing the user to which the data belongs.
3) Data Reference AVP: The requested data is indexed using the Data-Reference AVP.

The RepositoryData data has a data reference of "0".

Data relating to, for example, ImplicitIdentities, AllIdentities, and AliasIdentities may also be requested by the Application Server (XDMS/AS) via the Sh DIAMETER interface using data reference 10. The ImplicitIdentities, AllIdentities, and AliasIdentities are requested with the following information:

1) IMPU representing the user to which the data belongs.
2) Information element IMPLICIT_IDENTITIES, ALAIS_IDENTITIES, ALL_IDENTITIES.

Figure 1:
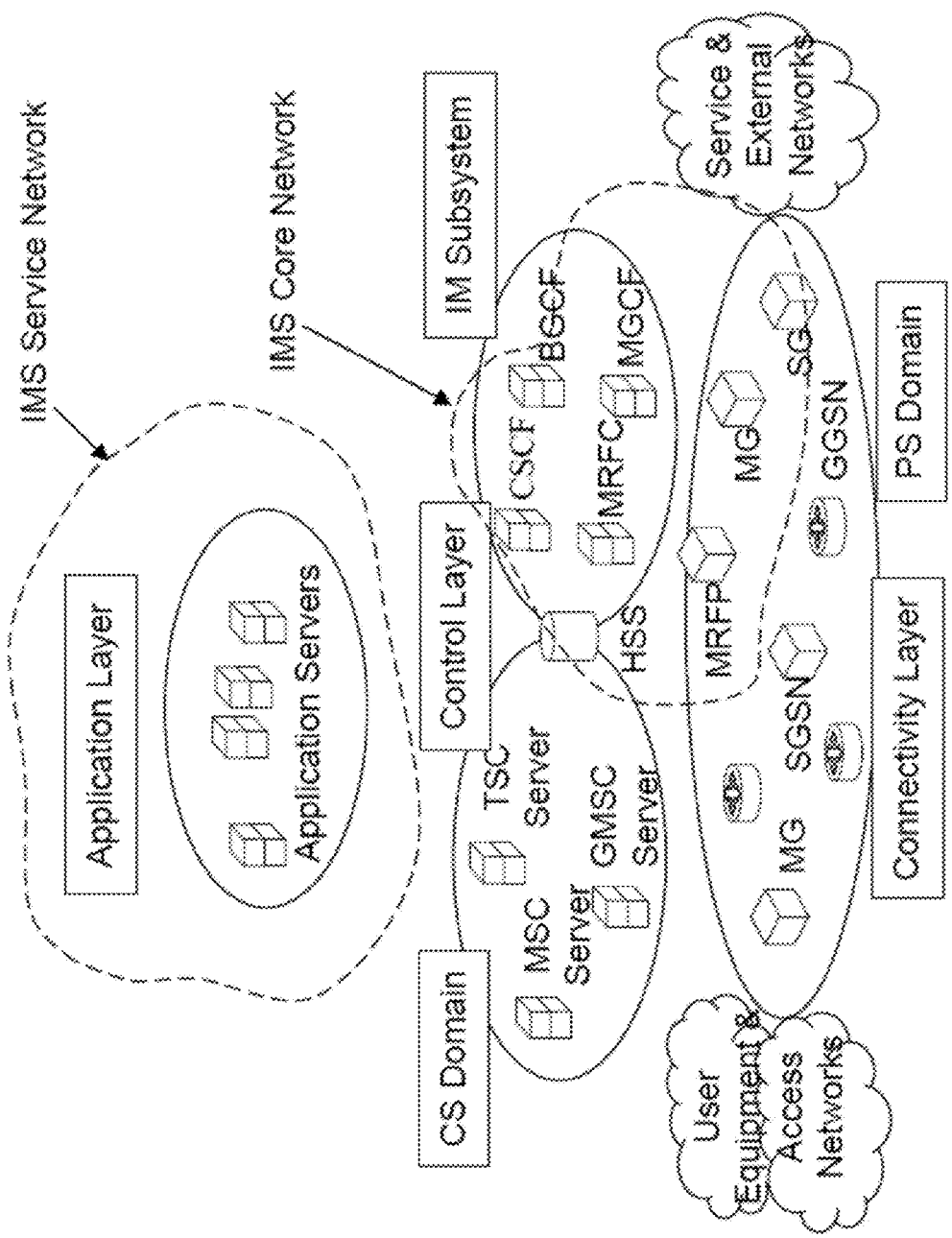
FIG. 1 illustrates schematically the integration of IMS into a 3G mobile communications system.
Figure 2:
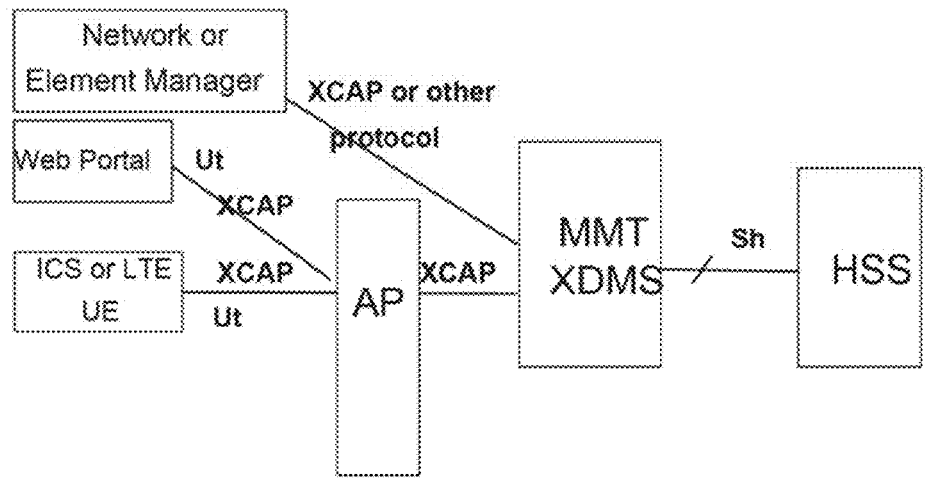
FIG. 2 illustrates the Ut and Sh interfaces in an LTE/IMS architecture.
Figure 3:
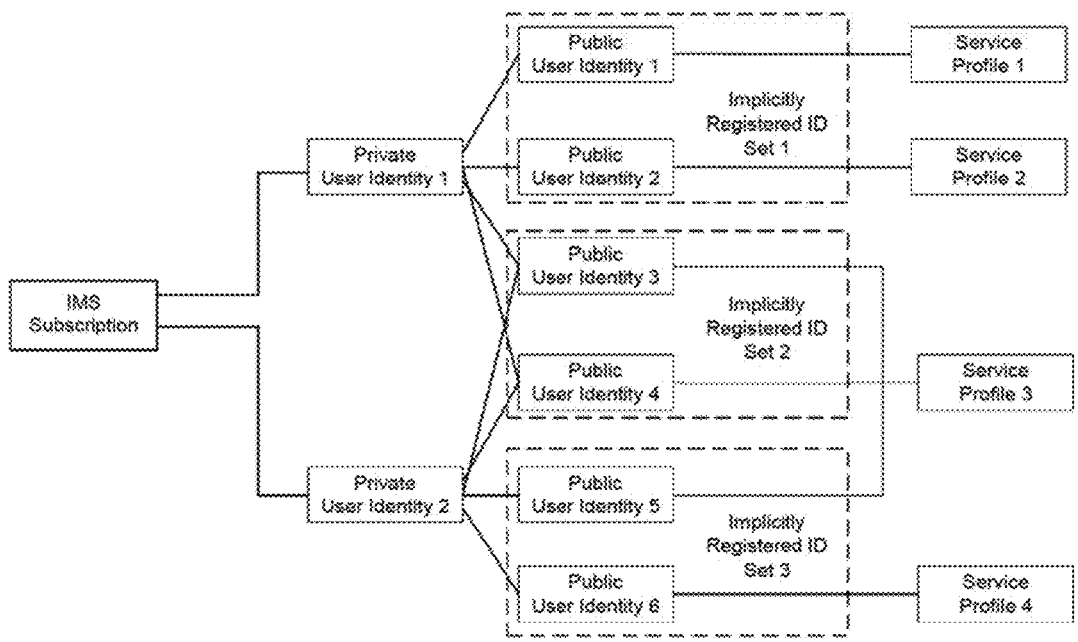
FIG. 3 illustrates schematically exemplary IMPU and IMPI combinations of a given IMS subscription.
Figure 4:
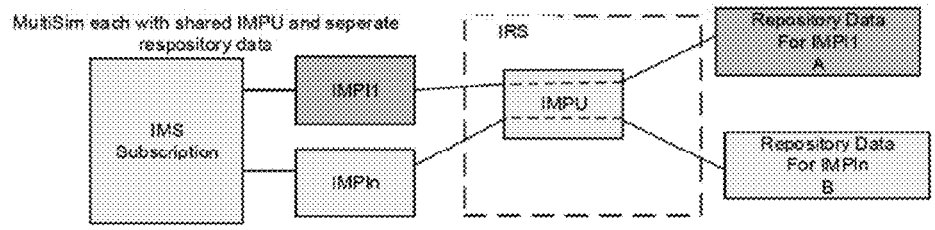
FIG. 4 illustrates a problem associated with accessing repository data for a Multisim with same IMPU and unique repository data for each IMPI.
Figure 5:
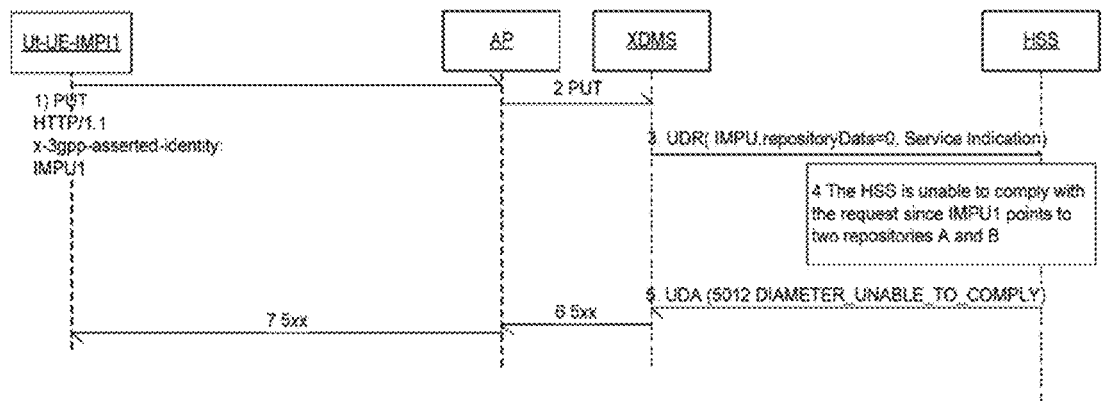
FIG. 5 further illustrates the problem of FIG. 4 due to a failure to update repository data for IMPI1 (UE) caused by an IMPU pointing to two repositories
Figure 6:
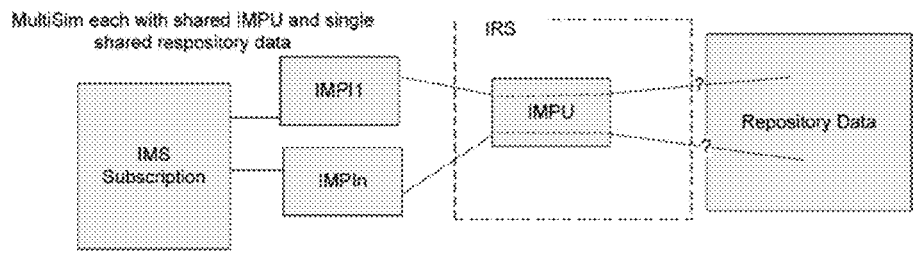
FIG. 6 illustrates a problem associated with accessing repository data for a Multisim with same IMPU and unique repository data for each IMPI.
Figure 7:
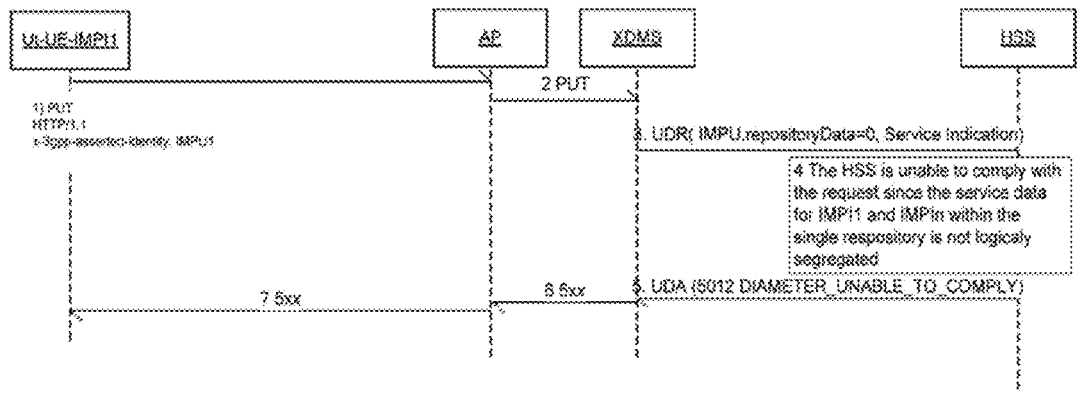
FIG. 7 further illustrates the problem of FIG. 6 due to a failure to update service data for IMPI1 (UE) caused by an IMPU pointing to one repositories being shared by all IMPI.
Figure 8:
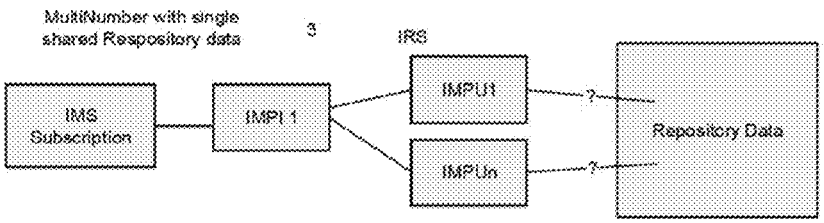
FIG. 8 illustrates a problem associated with accessing repository data for a SingleSim with multiple IMPUs sharing the same repository data.
Figure 9:
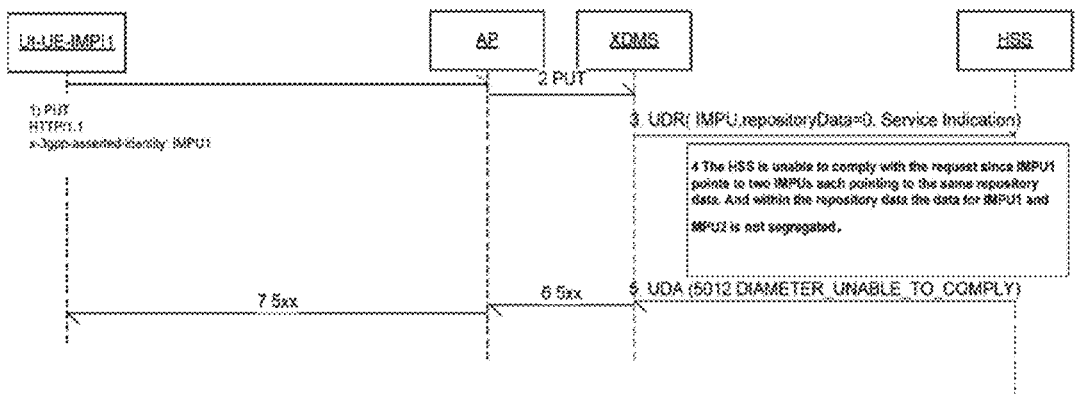
FIG. 9 further illustrates the problem of FIG. 8 due to a failure to update repository data by IMPI1, where IMPI one has two IMPUs pointing to the same repository data.

FIG. 3 illustrates schematically IMPI and IMPU combinations for Implicit Registered Identities (IRS). Alias Identities are grouped in a similar manner but are not shown.

Figure 12:
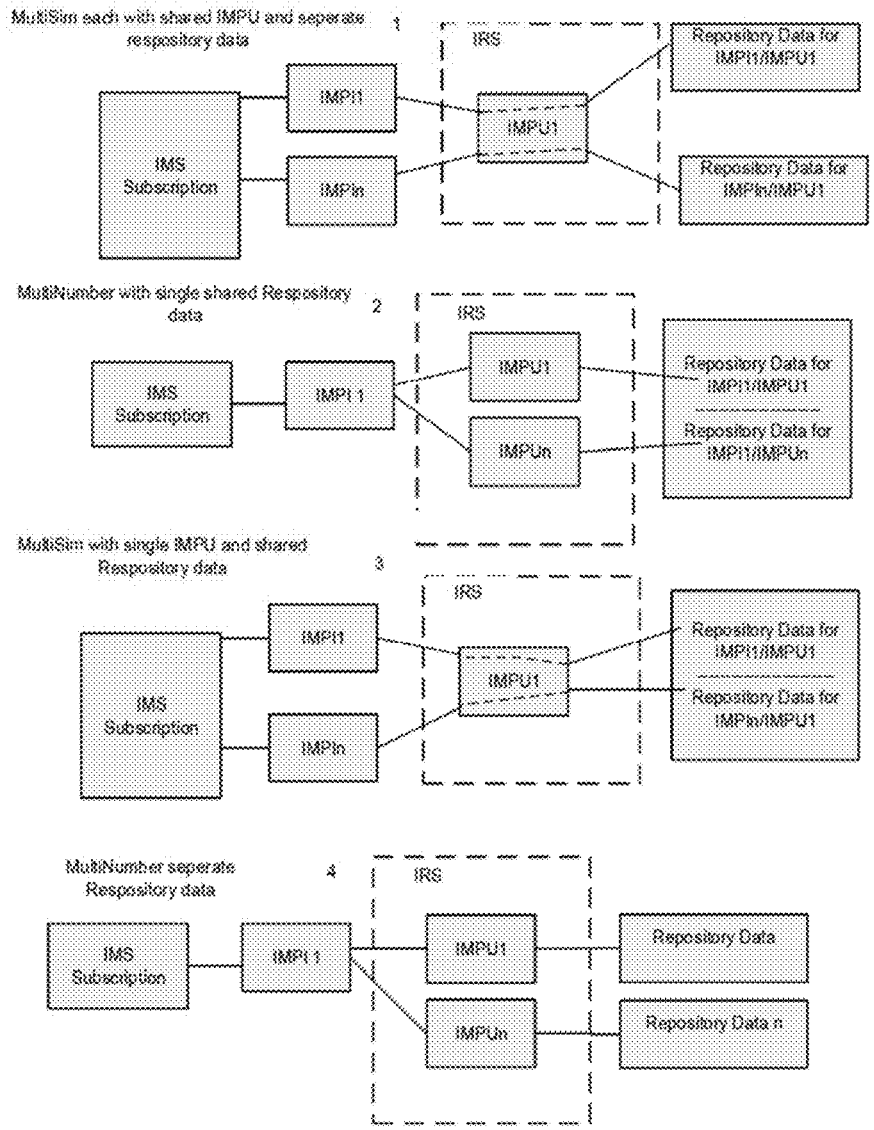
FIG. 12 shows exemplary service data for IMPI, IMPU combinations to facilitate Multisim and Multinumber with separate and shared service profiles.

FIG. 12 illustrates schematically repository service data for users with MultiSim (Multiple IMPI) and Multi-Number (IMPU), with a number of possible IMPI/IMPU arrangements. In particular, the following arrangements are shown:

Arrangement 1: multiple UEs (multiple IMPIs) with single IMPU arrangement, where the IMPU has multiple user service profile in IMS, one for each UE (IMPI).

Arrangement 2: A single UE (single IMPI) with multi IMPU arrangement, where each IMPU has the same user service profile in IMS. The IMPUs may or may not be in the same IRS set.

Arrangement 3: Multiple UEs (multiple IMPIs) with single IMPU arrangement, where the IMPU has one user service profile in IMS.

Arrangement 4: A single UE (single IMPI) with multi IMPU arrangement, where each IMPU has a user service profile in IMS. The IMPUs may or may not be in the same IRS set. [Note: This arrangement does not have MultiSim, MultiNumber shared and unique repository data access problems.]

Figure 13:
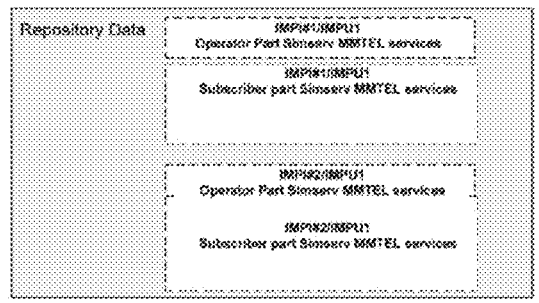
FIG. 13 illustrates schematically a logical segregation of service data to accommodate SingleSim with multiple numbers (IMPUs) sharing repository data, and MultiSim with single number (IMPU) sharing repository data.

In order to accommodate all the MultiSim and SingleSim arrangements considered above, and for the HSS to be able to access the correct repository service data, the Private Identity AVP is included in the Sh-Pull (UDR), Sh-Update (PUR), and Sh-Subs-Notif (PNR) for data references 0 and 10 as shown in Table 5. Furthermore, in order to accommodate the MultiSim and SingleSim cases, Arrangement 2 and Arrangement 3, where the MultiSim and SingleSim arrangements have a single repository data, the service data within the single repository is logically separated into a number of blocks as shown in FIG. 13, to allow the XDMS/AS to be able to read and update the correct service data for the IMPI/IMPU combination. The Private identity AVP may be included for all data references as specified in 3GPP TS 29.328.

For XDMS/AS and HSS nodes which do not support Table 5, the procedures for (C) Conditional Information elements as described in 3GPP TS 29.328 are followed by the XDMS/AS and HSS. This ensures backwards compatibility on the Sh interface.

Figure 14:
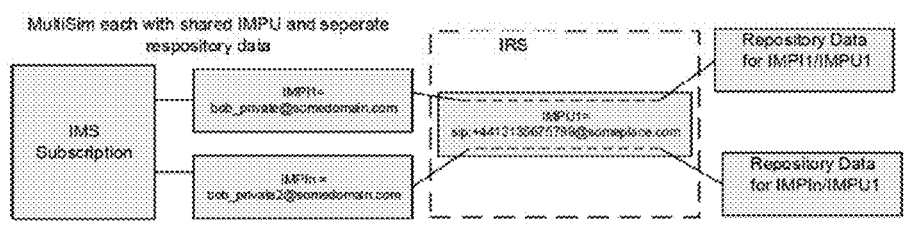
FIG. 14 illustrates schematically a subscription case involving a MutilSim (IMPI), one IMPU and separate repositories.

The following discussion concerns user management for a MultiSim (IMPI) with a shared IMPU and separate repository data containing service data. This arrangement is associated with a currently popular MultiSim service. The scenario is illustrated in FIG. 14.

Example Data:

```
IMPU1 = sip:+4412135675789@someplace.com;user=phone, alias
tel:+4412135675789
IMPI= bob_private@somedomain.com
+sip.instance="<urn:gsma:imei:90420156-025763-0>
IMPU1 = sip:+4412135675789@someplace.com;user=phone, alias
tel:+4412135675789
IMPIn= bob_private2@somedomain.com
+sip.instance="<urn:gsma:imei:90420156-025799-0>
```

Table 6 shows a Call Diversion (CDIV) service rule in subscriber part contained in repository data for IMPI1 and IMPU1=sip:+4412135675789@someplace.com; user=phone.

Table 7 shows a Call Diversion (CDIV) service rule in subscriber part contained in repository data for IMPIn and IMPU=sip:+4412135675789@someplace.com;user=phone.

Figure 15:
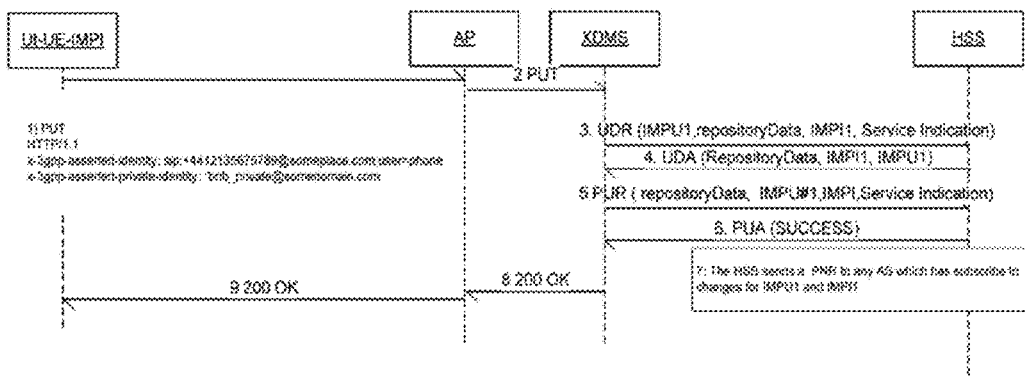
FIG. 15 illustrates an exemplary procedure where IMPI1/IMPU1 changes a CDIV rule target.

FIG. 15 illustrates the case where IMPI1/IMPU1 changes CDIV rule target. In particular, FIG. 15 shows the following steps:

```
1) The user sends a Ut request for IMPU1 using
        • IMPU1= X-3GPP-Asserted-identity:
           sip:+4412135675789@someplace.com;user=phone and
        • IMPI = X-3GPP-Asserted-Private-Identity: bob_private@somedomain.com to change
           the forward to target in the CDIV service, i.e.
<ss:target>sip:forwardtoperson2@telco.com</ss:target>to
<ss:target>sip:forwardtosomeotherperson@telco.com</ss:target>
PUT /mtasxdms/simservs.ngn.etsi.org/users/ sip:+4412135675789@someplace.com
/simservs.xml/~~/simservs/communication-
diversion/cp:ruleset/cp:rule%5b@id=%22rule1%22%5d/cp:actions/forward-
to/target?xmlns(cp=urn:ietf:params:xml:ns:common-policy) HTTP/1.1
X-3GPP-Asserted-identity: "sip:+4412135675789@someplace.com;user=phone"
X-3GPP-Asserted-Private-Identity: "bob_private@somedomain.com"
Host: 130.100.144.4:8090
Content-Type: application/xcap-el+xml
Content-Length: 50
Connection: Keep-Alive
If-Match: 0
sip:forwardtosomeotherperson@telco.com
2) AP forwards the PUT to XDMS/AS
3) UDR: XDMS sends an Sh UDR requests for the repository data for the IMPU1, using access
keys
        - Service-Indication AVP = = "service indication string"
        - Public-Identity AVP = X-3GPP-Asserted-Identity = IMPU1=
        sip:+4412135675789@someplace.com
        - User-Name AVP= X-3GPP-Asserted-Private-Identity = IMPI1
        =bob_private@somedomain.com
        - Data-Reference AVP = 0
4) XDMS/AS receives the IMPI1/IMPU1 service data, in the UDA, the data received is shown
in
Table 8 below.
The XDMS updates the ss:target element with sip:forwardtosomeotherperson@telco.com
5) The XDMS/AS update the user's repository service data and does a PUR command to send
the user's updated repository service data to the HSS with the new CDIV target:
        - Public-Identity AVP = X-3GPP-Asserted-Identity = IMPU1=
        sip:+4412135675789@someplace.com
        - User-Name AVP= X-3GPP-Asserted-Private-Identity = IMPI1
        =bob_private@somedomain.com
        - Data-Reference AVP = 0
        - User-Data AVP = updated data
Because the Ut sent both the IMPI and IMPU, and the HSS has received the IMPI1 and IMPU1
in the Sh request, the HSS knows the correct repository data to update, i.e. the repository Data
for IMPI1/IMPU1
6) The HSS replies with PUA DIAMETER_SUCCESS
7) The HSS sends a PNR to any AS which has subscribed to any changes in repository data for
IMPU1 and IMPI. The PNR consists of:
        - Public-Identity AVP = IMPU1
        - User-Name AVP = IMPI1
        - User-Data AVP = Updated service data
8) XDMS/AS sends back 200 OK to AP
9) AP sends 200 OK to XCAP client
```

The user's repository service data for IMPI1 and MPU1 now contains the CDIV target shown in Table 9 for the IMPU1=sip:+4412135675789@someplace.com and IMPI=bob_private@somedomain.com. The user's repository service data for CDIV for the IMPU1=sip:+4412135675789@someplace.com and IMPIn=bob_private2@somedomain.com remains unchanged.

(CDIV) service rule included in service data in Repository A. This is shown in Table 10. Similarly, Table 11 shows a subscriber data part of the service data in Repository for IMPI2 and IMPU1=sip:+4412135675789©someplace.com; user=phone and relating to a Call Diversion (CDIV) service rule.

Figure 17:
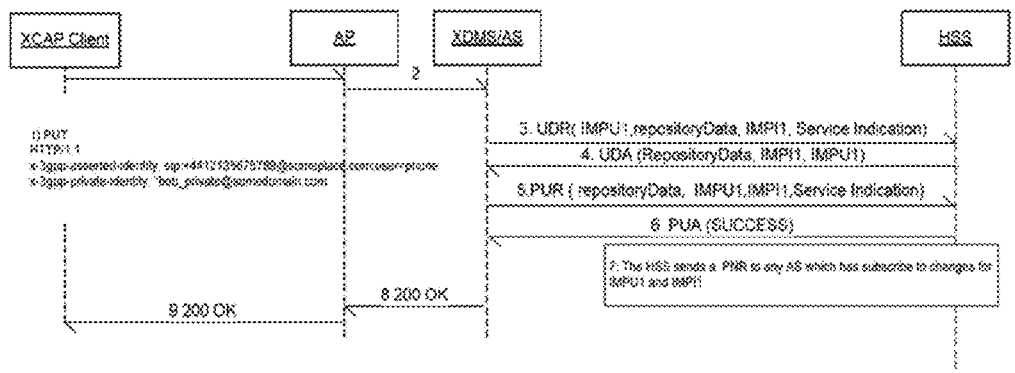
FIG. 17 illustrates an exemplary procedure where IMPI1/IMPU1 changes a CDIV rule target.
Figure 18:
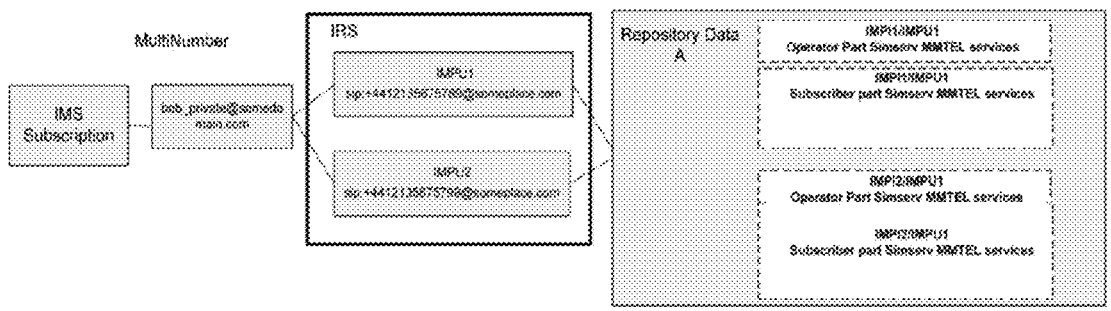
FIG. 18 illustrates schematically a subscription case involving a single IMPI, two IMPU IRS, and separate repository service data.

With reference to FIG. 17, in order to change the CDIV target rule, the following steps are applied:

---

1) The user sends a Ut request for IMPU1 using IMPU1= X-3GPP-Asserted-identity: sip:+4412135675789@someplace.com;user=phone and IMPI1 = X-3GPP-Asserted-Private-Identity: bob_private@somedomain.com to change the forward to target in the CDIV service <ss:target>sip:forwardtoperson2@telco.com</ss:target>to <ss:target>sip:forwardtosomeotherperson@telco.com</ss:target>

PUT /mtasxdms/simservs.ngn.etsi.org/users/ sip:+4412135675789@someplace.com
    /simservs.xml/~/simservs/communication-
    diversion/cp:ruleset/cp:rule%5b@id=%22rule1%22%5d/cp:actions/forward-
    to/target?xmlns(cp=urn:ietf:params:xml:ns:common-policy) HTTP/1.1
    X-3GPP-Asserted-identity: "sip:+4412135675789@someplace.com;user=phone"
    X-3GPP-Asserted-Private-Identity: "bob_private@somedomain.com"
    Host: 130.100.144.4:8090
    Content-Type: application/xcap-el+xml
    Content-Length: 50
    Connection: Keep-Alive
    If-Match: 0
    sip:forwardtosomeotherpersonfromimpi1@telco.com 2) AP forwards the PUT to XDMS/AS
3) UDR: XDMS sends a User-Data -Request to HSS requests for the repository service data for the IMPU1. Using the following access keys
    - Service-Indication AVP = = "service indication string"
    - Public-Identity AVP = X-3GPP-Asserted-Identity = IMPU1
    - User-Name AVP= X-3GPP-Asserted-Private-Identity = IMPI1
    =bob_private@somedomain.com
    - Data-Reference AVP = 0
4) The XDMS/AS receives the IMPU1 service data, in the UDA from HSS; the data received is shown in Table 12.
    Because the repository service data is logically segregated into IMPI1/IMPU1 and IMPI2/IMPU1 parts, the XDMS is able to update the correct part of the repository service data. The XDMS updates the ss:target element with sip:forwardtosomeotherpersonfromimpi1 @telco.com for IMPI/IMPU1
5) The XDMS/AS does an PUR command to update the users repository service data in the HSS with the new target
    - Public-Identity AVP = IMPU1
    - User-Name AVP = IMPI1
    - Data-Reference AVP -= 0
    - User-Data AVP = updated service data
6) The HSS replies with PUA
7) The HSS sends a PNR to any AS which has subscribed to any changes in repository data for IMPU1 and IMPI1 , the PNR consists of:
    - Public-Identity AVP = IMPU1
    - User-Name AVP = IMPI1
    - User-Data AVP = Updated service data
8) The XDMS/AS sends back 200 OK to AP
9) AP sends back 200 OK to the XCAP client

---

Figure 16:
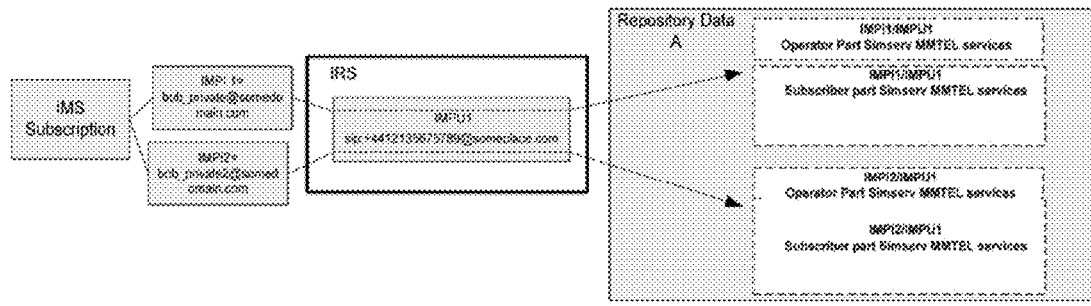
FIG. 16 illustrates schematically a subscription case involving a MultiSim Single Number, and shared single repository service data.

The following discussion concerns a user case involving a MultiSIM (Multiple IMPI) with a single telephone number and shared repository data. The MultiSim service involves a user having several UEs but only one number. In this example the repository service data is shared. This scenario is illustrated in FIG. 16.

Example Data for IMPI1 with IMPU in Repository Data "A"

---

IMPU1 = sip:+4412135675789@someplace.com;user=phone, alias tel:+4412135675789
IMPI= bob_private@somedomain.com
+sip.instance="<urn:gsma:imei:90420156-025763-0>
IMPU1 = sip:+4412135675789@someplace.com;user=phone, alias tel:+4412135675789
IMPI2= bob_private2@somedomain.com
+sip.instance="<urn:gsma:imei:90420156-025799-0>

---

For IMPI1 and IMPU1=sip:+4412135675789©someplace.com;user=phone, the user has a Call Diversion The users repository service data now contains the CDIV target shown in Table 13 for the IMPU1=sip:+4412135675789@someplace.com and IMPI=bob_private@somedomain.com. The user's repository service data for CDIV for the IMPU1=sip:+4412135675799@someplace.com and IMPI=bob_private2@somedomain.com remains unchanged.

Considering now the case where IMPI2,IMPU1 modifies repository service data, this is substantially the same procedure as that described for the previous case, except that the following Identities are provided in the Ut XCAP commands:

where    IMPI2=X-3GPP-Asserted-Private-Identity: bob_private2@somedomain.com and IMPU1=X-3GPP-Asserted-identity:

"sip:+4412135675789@someplace.com;user=phone"

Additionally, at step 7, the HSS sends a PNR to any AS which has subscribed to any changes in repository data for IMPU1 and IMPI2. The PNR consists of
Public-Identity AVP=IMPU1
User-Name AVP=IMPI2
User-Data AVP=Updated service data In yet another alternative use case, IMPI2 changes the target. This is substantially the same procedure as described for the previous case except that the following is sent on the Ut interface:
X-3G PP-Asserted-identity: "sip:+4412135675789@someplace.com; user=phone"
X-3GPP-Asserted-Private-Identity: "bob_private2@somedomain.com"
and the following is sent on the Sh interface
IMPU1=sip:+4412135675789@someplace.com
IMPI2=bob_private2@somedomain.com In step 4, because the repository service data is logically segregated into IMPI2/IMPU1 and IMPI2/IMPU1 parts, the XDMS is able to update the correct part of the repository service data.

Figure 20:
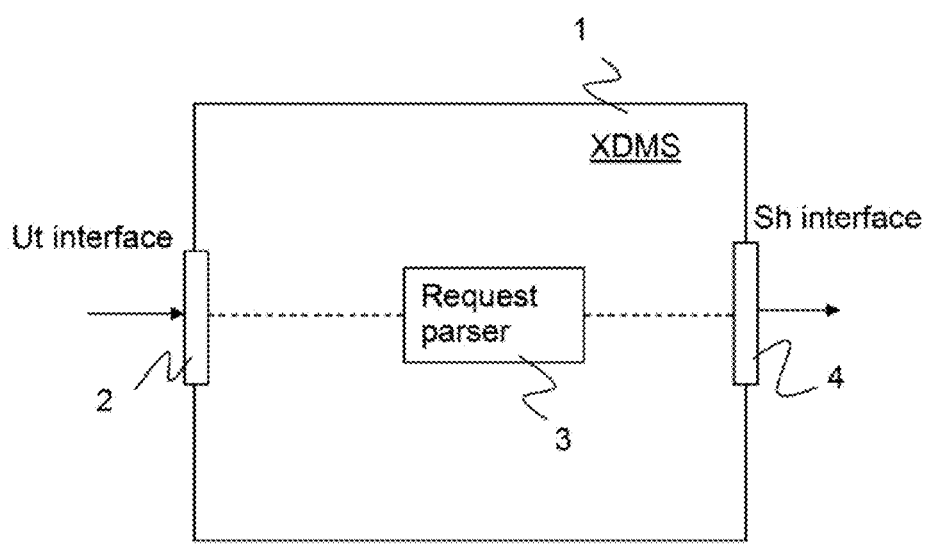
FIG. 20 illustrates schematically an XDMS configured to implement improved supplementary service data management.

Considering now the Multinumber, singleSim, and single repository service data case, the associated problems are addressed by logically segregating the service data in the repository as shown in FIG. 20. This case involves a user with a single IMPI(UE) and two IMPU(IMS identities) and a shared repository service data. This is a common subscription arrangement offered by operators to users who roam frequently and want a different number activated and different service data to be valid when they are in a certain roaming domain or location.

Example Data:

IMPU1 = sip:+4412135675789@someplace.com;user=phone, alias tel:+4412135675789
IMPI= bob_private@somedomain.com
+sip.instance="<urn:gsma:imei:90420156-025763-0>
IMPU2 = sip:+4412135675799@someplace.com;user=phone, alias tel:+4412135675799
IMPI= bob_private@somedomain.com
+sip.instance="<urn:gsma:imei:90420156-025763-0>

The user has the Call Diversion (CDIV) service rule included in Subscriber data part of the service data in Repository A for IMPI1 and IMPU1=sip:+4412135675789©someplace.com;user=phone, as shown in Table 14 below.

Similarly, the user has the Call Diversion (CDIV) service rule included in Subscriber data part of the service data in Repository A for IMPI1 and IMPU2=sip:+4412135675799©someplace.com;user=phone, as shown in Table 15 below.

Figure 19:
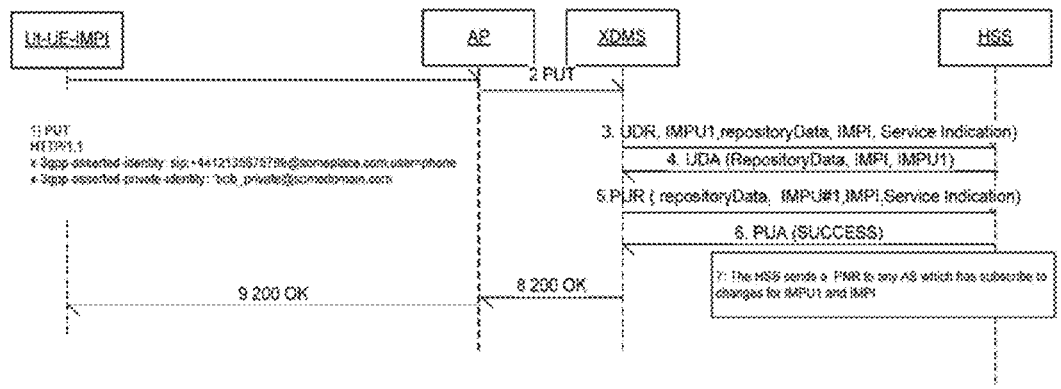
FIG. 19 illustrates an exemplary procedure where IMPU1 changes a CDIV rule target.

FIG. 19 illustrates a high level procedure for implementing changes to the CDIV rule target. In particular, the following steps are shown:

1. The user sends a Ut request for IMPU1 using IMPU1= X-3GPP-Asserted-identity: sip:+4412135675789@someplace.com;user=phone and IMPI = X-3GPP-Asserted-Private-Identity: bob_private@somedomain.com to change the forward to target in the CDIV service
  <ss:target>sip:forwardtoperson2@telco.com</ss:target>to
  <ss:target>sip:forwardtosomeotherperson@telco.com</ss:target>
    PUT /mtasxdms/simservs.ngn.etsi.org/users/ sip:+4412135675789@someplace.com
    /simservs.xml/~~/simservs/communication-
    diversion/cp:ruleset/cp:rule%5b@id=%22rule1%22%5d/cp:actions/forward-
    to/target?xmlns(cp=urn:ietf:params:xml:ns:common-policy) HTTP/1.1
    X-3GPP-Asserted-identity: "sip:+4412135675789@someplace.com;user=phone"
    X-3GPP-Asserted-Private-Identity: "bob_private@somedomain.com"
    Host: 130.100.144.4:8090
    Content-Type: application/xcap-el+xml
    Content-Length: 50
    Connection: Keep-Alive
    If-Match: 0
    sip:forwardtosomeotherperson@telco.com
2. AP forwards the PUT to XDMS/AS
3. UDR: XDMS sends a UDR requests for the repository service data for the IMPU1. Using access keys
    - Service-Indication AVP = = "service indication string"
    - Public-Identity AVP = X-3GPP-Asserted-Identity = IMPU1= sip:+4412135675789@someplace.com
    - User-Name AVP= X-3GPP-Asserted-Private-Identity = IMPI1 =bob_private@somedomain.com
    - Data-Reference AVP = 0
4. XDMS/AS receives the IMPU1 service data, in the UDA, the data shown in Table 16 received
is
    Because the repository service data is logically segregated into IMPI1/IMPU1 and
    IMPI2/IMPU1 parts the XDMS is able to update the correct part of the repository
    service data.
The XDMS updates the ss:target element with sip:forwardtosomeotherperson@telco.com.
5. XDMS/AS does a PUR command to update the users repository service data in the HSS with the new target
        - Public-Identity AVP = IMPU1
        - User-Name AVP = IMPI1
        - Data-Reference AVP -= 0
        - User-Data AVP = updated service data
Because the HSS received the IMPI and IMPU1 in the Ut request, it knows the correct repository service data to update, Repository data 1
6. HSS replies with PUA
7. The HSS sends a PNR to any AS which has subscribed to any changes in repository data for IMPU1 and IMPI, the PNR consists of
        - Public-Identity AVP = IMPU1
        - User-Name AVP = Private Identity = IMPI1

-continued

- User-Data AVP = Updated service data
8. XDMS/AS sends back 200 OK to AP
9. AP sends 200 OK to XCAP client The users repository service data now contains the CDIV target for the IMPU1=sip:+4412135675789@someplace.com and IMPI=bob_private@somedomain.com, as shown in Table 17 below. The users repository service data for CDIV for the IMPU2=sip:+4412135675799@someplace.com and IMPI=bob_private@somedomain.com remains unchanged.

The operator part of the repository user's service data is modified, read and set, in the same manner as that used and shown for the Ut XCAP commands, with the operator NM providing the IMPI and IMPU to index the correct user's repository service data in the HSS. Operator commands may be, for example:
X-3GPP-Asserted-identity: "sip:+4412135675789@someplace.com;user=phone"
X-3GPP-Asserted-Private-Identity: bob_private2@somedomain.com In addition the IMPI/IMPU are both sent in the Sh interface messages.

User data Management for IMS subscribers with Multi-Sim, and MutilNumber is not possible today for the most important combinations. The approach presented here facilitates both user and operator management for users with important Muitisim and Multi-Number combination in IMS for LTE and ICS. Implementation of other, existing combinations of Muitisim and Multi-Number are unaffected by this new approach.

By way of a further summary, it is noted that the Client sends an IMPU and IMPI in requests together with the XML data (if there is a change) to the XDMS/AS. The top envelope is HTTP.

However, the actual service data is not limited to XML; it can be binary format, as long as the XDMS/AS knows how to present it in XML (3GPP) format to the HSS and knows how to update it. The XDMS/AS Sh interface towards the HSS is enhanced to include the IMPI and IMPU for UDR, PUR, SNR for data references 0,10, to identify the correct service data repository on the HSS. Furthermore, for shared service data, the data is segregated so that the XDMS know which parts to update.

From the above discussion it will be understood that new functionality is introduced into the XML Document Management Server in order to provide the improved service delivery to end users and operators. FIG. 20 illustrates such a modified XML Document Management Server 1. The server comprises a first interface or interfaces 2 for receiving supplementary service data requests, and a request parser 3 configured, for each request, to parse the request to determine if it contains both an X-3GPP-Asserted-Private-Identity header and an X-3GPP-Asserted-Identity header. The server further comprises an Sh interface 4 for generating an Sh message corresponding to each request and, in the event that both an X-3GPP-Asserted-Private-Identity header and an X-3GPP-Asserted-Identity header are present in the request, for including these in the Sh message, and for sending the Sh message to said subscription data repository. The modified XDMS is implemented using a combination of hardware (including processors, memories, etc) and software.

Figure 21:
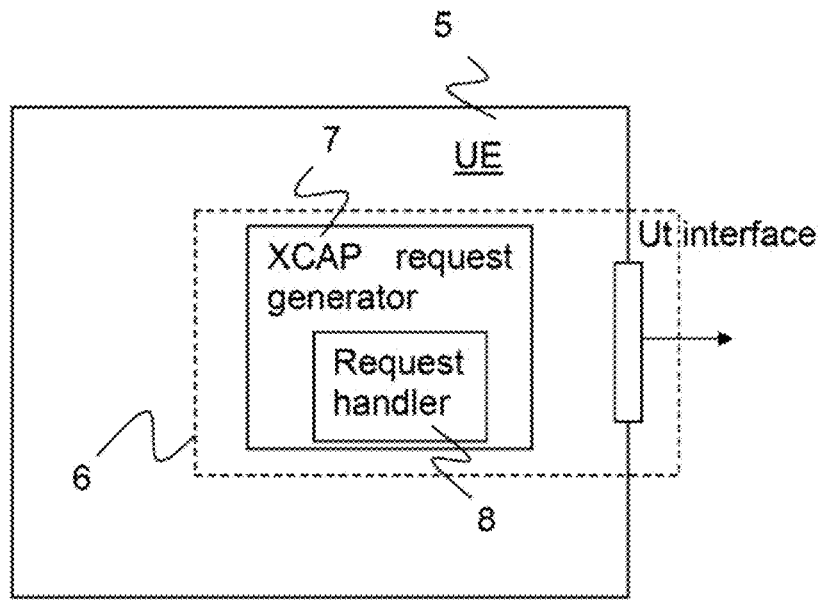
FIG. 21 illustrates schematically a User Equipment configured to operate with the XDMS of FIG. 20.

Considering now FIG. 21, this illustrates schematically a User Equipment (UE) 5 configured to interact with the XDMS over the Ut interface. The UE 5 comprises a Ut client 6 which in turn comprises an XCAP request generator 7 for generating an XCAP request in respect of a data block of supplementary service data stored the HSS. As already discussed, this data block is associated with a given private user identity (IMPI) and a given public user identity (IMPU) of the user. The XCAP request generator 7 further comprises a request handler 8 for including said private and public user identities within the XCAP request as an X-3GPP-Asserted-Private-Identity header and an X-3GPP-Asserted-Identity header or an X-3GPP-Intended-Indentity header.

Figure 22:
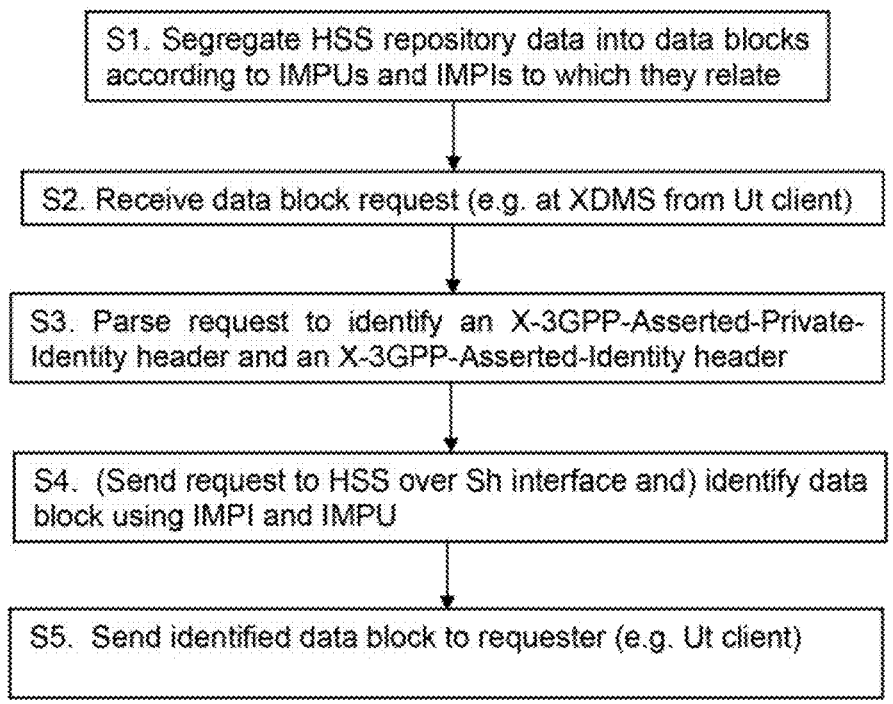
FIG. 22 is a flow chart illustrating a method of managing supplementary service data stored in the IMS.

FIG. 22 is a flow diagram further illustrating this approach to managing supplementary service data associated with an IP Multimedia subscription. The method comprises, within a subscription data repository, segregating, S1, said service data into a plurality of data blocks according to the private user identities (IMPIs) and public user identities (IMPUs) to which they relate. This step might be carried out, for example, during initial provisioning of the subscriber in the IMS network. Subsequently, a request is received S2 for a data block (e.g. from a Ut client). The request is parsed S3 to identify an X-3GPP-Asserted-Private-Identity header and an X-3GPP-Asserted-Identity header. The identified X-3GPP-Asserted-Private-Identity header and X-3GPP-Asserted-Identity header are used to identify S4 the associated data block, and the identified data block is sent S5 to a requesting entity. The modified UE is implemented using a combination of hardware (including processors, memories, etc) and software.

It will be appreciated by the person of skill in the art that various modifications may be made to the above described examples and/or embodiments without departing from the scope of the present invention.

The following list of abbreviations will be helpful in understanding the foregoing discussion:
AS Application Server
AP Authentication Proxy
BSF Bootstrapping server functionality (BSF is hosted in a network element under the control of an MNO)
CDIV Call Diversion
FQDN Fully Qualified Domain Name
GBA Generic Bootstrapping Architecture
HSS Home Subscriber System
HTTP Hypertext Transfer Protocol
ICS IMS Centralised Services
IMPI IP Multimedia Private Identity
IMPU IP Multimedia Public Identity
IMS IP Multimedia Subsystem
LTE Long Term Evolution
MNO Mobile network operator
NAF Operator-controlled network application function functionality (NAF is hosted in a network element under the control of an MNO)
Ua UE-NAF interface for GAA applications
Ub UE-BSF interface for bootstrapping
UE User Equipment
Ut User data management Interface XCAP The Extensible Markup Language (XML) Configuration Access Protocol
XML Extensible Markup Language
XDMS XML Document Management Server
Zh BSF-HSS interface for bootstrapping procedure

TABLE 1

```
GET
/mtasxdms/simservs.ngn.etsi.org/users/sip:someone@somplace.com/
simservs.xml HTTP/1.1
X-3GPP-Asserted-identity:"sip:someone@somplace.com"
Host: 130.100.144.4:8090
Content-Length: 0
Connection: Keep-Alive
```

TABLE 2

```
HTTP/1.1 200 OK
Server: Apache-Coyote/1.1
Cache-Control: no-cache
Etag : 0
Content-Type : application/simservs+xml
Content-Length: 643
Date: Wed, 28 Mar 2007 12:21:32 GMT
<?xml version="1.0" encoding="UTF-8"?>
<ss:simservs xmlns:ss="http://uri.etsi.org/ngn/params/xml/simservs/xcap">
    <ss:communication-diversion
xmlns:cp="urn:ietf:params:xml:ns:common-policy" active="true">
        <cp:ruleset>
            <cp:rule id="rule1">
                <cp:conditions/>
                <cp:actions>
                    <ss:forward-to>
                        <ss:target>sip:forwardperson@telco.com</ss:target>
                        <ss:notify-caller>true</ss:notify-caller>
                    </ss:forward-to>
                </cp:actions>
            </cp:rule>
        </cp:ruleset>
    </ss:communication-diversion>
</ss:simservs>
```

TABLE 3

```
GET     /mtasxdms/simservs.ngn.etsi.org/users/sip:someone@
somplace.-com/simservs.xml/~~/simservs/communication-diversion
HTTP/1.1
X-3GPP-Asserted-identity: "sip:someone@somplace.com"
Host: 130.100.144.4:8090
Content-Length: 0
Connection: Keep-Alive
```

TABLE 4

```
HTTP/1.1 200 OK
Server: Apache-Coyote/1.1
Cache-Control: no-cache
Etag : 0
Content-Type : application/xcap-el+xml
Content-Length : 513
Date : Mon, 10N Nov 2012 09 :11 :10 GMT
<ss :communication-diversion
xmlns :cp="urn :ietf :params :xml :ns :common-
policy" active="true">
    <cp :ruleset>
        <cp:rule id="rule1">
            <cp:conditions/>
            <cp:actions>
                <ss:forward-to>
                    <ss:target>sip:forwardtoperson@telco.com</ss:target>
                    <ss:notify-caller>true</ss:notify-caller>
                </ss:forward-to>
            </cp:actions>
```

TABLE 4-continued

```
        </cp:rule>
    </cp:ruleset>
</ss:communication-diversion>
```

TABLE 5

| Data Reference | XML tag | Access key | Sh operations |
|---|---|---|---|
| 0 | RepositoryData | Data Reference +(IMS Public User Identity OR Public Service Identity) +Service Indication +[Private Identity] | Sh-Pull Sh-Update Sh-Subs-Notif |
| 10 | IMSPublicIdentity | Data Reference +(IMS Public User Identiy OR Public Service Identity) +[Private Identity] +[Requested Identity Set] | Sh-Pull Sh-Subs-Notif |

TABLE 6

```
<ss :communication-diversion    xmlns :cp=
"urn :ietf :params :xml :ns :common-policy" active="true">
    <cp :ruleset>
        <cp:rule id="rule1">
            <cp:conditions/>
            <cp:actions>
                <ss:forward-to>
                    <ss:target>sip:forwardtoperson@telco.com</ss:target>
                    <ss:notify-caller>true</ss:notify-caller>
                </ss:forward-to>
            </cp:actions>
        </cp:rule>
    </cp:ruleset>
</ss:communication-diversion>
```

TABLE 7

```
<ss :communication-diversion xmlns :cp=
"urn :ietf :params :xml :ns :common-policy" active="true">
    <cp :ruleset>
        <cp:rule id="rule1">
            <cp:conditions/>
            <cp:actions>
                <ss:forward-to>
                    <ss:target>sip:forwardtoperson2@telco.com</ss:target>
                    <ss:notify-caller>true</ss:notify-caller>
                </ss:forward-to>
            </cp:actions>
        </cp:rule>
    </cp:ruleset>
</ss:communication-diversion>
```

TABLE 8

```
<ss :communication-diversion xmlns :cp=
"urn :ietf :params :xml :ns :common-policy" active="true">
    <cp :ruleset>
        <cp:rule id="rule1">
            <cp:conditions/>
            <cp:actions>
                <ss:forward-to>
                    <ss:target>sip:forwardtoperson@telco.com</ss:target>
                    <ss:notify-caller>true</ss:notify-caller>
                </ss:forward-to>
            </cp:actions>
```

TABLE 8-continued

```
        </cp:rule>
      </cp:ruleset>
</ss:communication-diversion>
```

TABLE 9

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target> sip:forwardtosomeotherperson@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

TABLE 10

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target>sip:forwardtoperson@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

TABLE 11

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target>sip:forwardtoperson2@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

TABLE 12

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target>sip:forwardtoperson@telco.com
          </ss:target>
          <ss:notify-caller>true</ss:notify-caller>
```

TABLE 12-continued

```
        </ss:forward-to>
      </cp:actions>
    </cp:rule>
  </cp:ruleset>
</ss:communication-diversion>
```

TABLE 13

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target> sip:forwardtosomeotherpersonfromimpi1@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

TABLE 14

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target>sip:forwardtoperson@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

TABLE 15

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target>sip:forwardtoperson2@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

TABLE 16

```
<ss:communication-diversion xmlns:cp="urn:ietf:params:xml:ns:
common-policy" active="true">
  <cp:ruleset>
    <cp:rule id="rule1">
      <cp:conditions/>
      <cp:actions>
        <ss:forward-to>
          <ss:target>sip:forwardtoperson@telco.com
```

TABLE 16-continued

```
        </ss:target>
        <ss:notify-caller>true</ss:notify-caller>
      </ss:forward-to>
    </cp:actions>
  </cp:rule>
</cp:ruleset>
</ss:communication-diversion>
```

TABLE 17

```
<ss :communication-diversion  xmlns :cp=» urn :ietf :params :xml :ns :
common-policy » active=» true » >
  <cp :ruleset>
    <cp:rule id="rule1">
      <cp:conditions/>
      <cp:actions>
        <ss:forward-to>
          <ss:target> sip:forwardtosomeotherperson@telco.com
          </ss:target>
          <ss:notify-caller>true</ss:notify-caller>
        </ss:forward-to>
      </cp:actions>
    </cp:rule>
  </cp:ruleset>
</ss:communication-diversion>
```

The invention claimed is:

1. An Extensible Markup Language (XML) Document Management Server for use within an IP Multimedia Subsystem (IMS) network and being configured to enable IMS subscribers and a network operator to manage supplementary service data stored in a subscription data repository, the Server comprising:
   at least one processor circuit; and
   at least one memory connected to the at least one processor circuit and storing program instructions that are executed by the at least one processor to perform operations comprising:
      receiving, by a first interface of the Server, a supplementary service data request from a requesting entity;
      parsing, by a request parser the supplementary service data request to determine if it contains both an X-3GPP-Asserted-Private-Identity header and an X-3GPP-Asserted-Identity header;
      generating, by an Sh interface of the Server, an Sh message corresponding to the supplementary service data request and, responsive to both an X-3GPP-Asserted-Private-Identity header and an X-3GPP-Asserted-Identity header being present in the supplementary service data request, including the X-3GPP-Asserted-Private-Identity header and the X-3GPP-Asserted-Identity header in the Sh message, and sending the Sh message to said subscription data repository;
      receiving, via the Sh interface, a response from said subscription data repository; and
      transmitting, via the first interface, the response to the requesting entity.

2. A Server according to claim 1, wherein said request is one of: a request to obtain a data block from the subscription data repository and a request to store or change a data block in the subscription data repository.

3. A Server according to claim 2, wherein the response includes one of: a requested data block and a response to the store or change request, said first interface being configured to send the received response to a requesting entity.

4. A Server according claim 1, wherein said first interface is a Ut interface towards a Ut client, said request being an Extensible Markup Language (XML) Configuration Access Protocol (XCAP) request.

5. A method of managing supplementary service data associated with an IP Multimedia subscription, the method comprising:
   within a subscription data repository, segregating said supplementary service data into a plurality of data blocks according to the private user identities (IMPIs) and public user identities (IMPUs) to which they relate by, for users with MultiSim and MultiNumber subscriptions each with a shared repository data, segregating the shared repository service data into IMPU/IMPI data blocks to allow an X-3GPP-Asserted-Private-Identity header and an X-3GPP-Asserted-Identity header to be used to identify the associated data block;
   receiving requests for data blocks;
   for each request:
      parsing the request to identify the X-3GPP-Asserted-Private-Identity header and the X-3GPP-Asserted-Identity header;
      using the identified X-3GPP-Asserted-Private-Identity header and X-3GPP-Asserted-Identity header to identify the associated data block; and
      sending the identified data block to a requesting entity.

6. A method according to claim 5, further comprising initiating said requests at one of a Ut client within a User Equipment and a network operator entity, the requests being received at an XML Document Management Server (XDMS), via a Ut reference point, wherein said step of parsing is carried out.

7. A method according to claim 6, wherein said XDMS and said subscription data repository are couple via an Sh reference point.

8. A method according to claim 5, wherein a given request relates to a subscription matching one of the following subscription profiles:
   MultiSim case with the same IMPU;
   Singles Sim with multiple IMPUs.

9. A method according to claim 5, wherein a public user identity may be a mobile station international subscriber directory number (MSISDN) based IMPU and said private user identity may be an IMPI derived from an IMSI.

10. A method according to claim 5, wherein said step of segregating said service data into a plurality of data blocks according to the private user identities (IMPIs) and public user identities (IMPUs) to which they relate comprises, for users with MultiSim and MultiNumber subscriptions with unique repository service data for each IMPU/IMPI, mapping each subscription repository service data to a respective data block.

11. A User Equipment configured to enable a user to access IP Multimedia Subsystem (IMS) services and comprising a Ut client, the Ut client comprising:
   at least one processor circuit; and
   at least one memory connected to the at least one processor circuit and storing program instructions that are executed by the at least one processor to perform operations comprising:
      generating, by an Extensible Markup Language (XML) Configuration Access Protocol (XCAP) request generator, an XCAP request in respect of a data block of supplementary service data stored in a subscription data repository within an IMS network the data block being one of a plurality of data blocks segregated by subscription data repository according to the private user identities (IMPIs) and public user identities (IMPUs) to which they relate to allow an X-3GPP-Asserted-Private-Identity header and an X-3GPP-Asserted-Identity header to be used to identify each of the plurality of data blocks, the data block being associated with a given private user identity (IMPI) and a given public user identity (IMPU) of the user, the XCAP request generator comprising a request handler for including said private and public user identities within the XCAP request as an X-3GPP-Asserted-Private-Identity header and an X-3GPP-Asserted-Identity header or an X-3GPP-Intended-Indentity header, wherein the XCAP request is one of: a request to obtain a data block from the subscription data repository and a request to store or change a data block in the subscription data repository;

transmitting the XCAP request to an Extensible Markup Language (XML) Document Management Server; and receiving a response to the XCAP request from the XML Document Management Server, the response including one of: the data block and a response to the store or change request.

12. A User Equipment according to claim 11, wherein said XCAP request is one of an HTTP GET, PUT, and DELETE request.

13. A User Equipment according to claim 11, wherein said public user identity is a mobile station international subscriber directory number (MSISDN) based IMPU and said private user identity is an IMPI derived from an IMSI.

\* \* \* \* \*